United States Patent [19]

Madge et al.

[11] Patent Number: 4,985,888
[45] Date of Patent: Jan. 15, 1991

[54] TOKEN RING SYSTEM HIERARCHY

[75] Inventors: Robert Madge, Giles; David Woodfield, Walsall, both of England

[73] Assignee: Madge Networks Limited, Great Britain

[21] Appl. No.: 451,118

[22] Filed: Dec. 14, 1989

Related U.S. Application Data

[63] Continuation-in-part of Ser. No. 177,764, Apr. 5, 1988, Pat. No. 4,905,230.

[51] Int. Cl.[5] ............................................. H04J 3/00
[52] U.S. Cl. ................................. 370/85.5; 370/85.12; 370/85.13
[58] Field of Search ..................... 370/85.5, 17, 85.12, 370/85.13

[56] References Cited

U.S. PATENT DOCUMENTS

| | | | |
|---|---|---|---|
| 4,549,291 | 10/1985 | Renoulin et al. | 370/85.5 |
| 4,587,651 | 5/1986 | Nelson et al. | 370/89 |
| 4,622,550 | 11/1986 | O'Connor et al. | 370/85.5 |
| 4,736,368 | 4/1988 | Szczepanek | 370/85.5 |
| 4,751,697 | 6/1988 | Hunter et al. | 370/86 |
| 4,757,497 | 7/1988 | Beierle | 370/89 |

Primary Examiner—Joseph A. Orsino
Assistant Examiner—Geoff Sutcliffe
Attorney, Agent, or Firm—Wood, Herron & Evans

[57] ABSTRACT

A communications network comprising a hierarchy of communications systems all operating within the constraints of token ring protocols and operationally defining a single shared token ring. At least one of said systems is formed by a token ring hub as disclosed and claimed in our copending application 177,764 and is connected into a system comprising the next higher hierarchal level which may be another such token ring hub or a token ring LAN system. Each said hub has means for receiving a signal which indicates that the standard token ring protocols are satisfied with respect to the direct connection of the hub of a computer having a token ring adapter card fitted, or indicative of such a computer connected to another said hub at a lower level of the hierarchy. Said means transmits a comparable signal to the next system into which the respective hub is connected in hierarchal succession likewise indicative that the token ring protocols are satisfied with respect to the connection of the respective hub into the said next system.

3 Claims, 7 Drawing Sheets

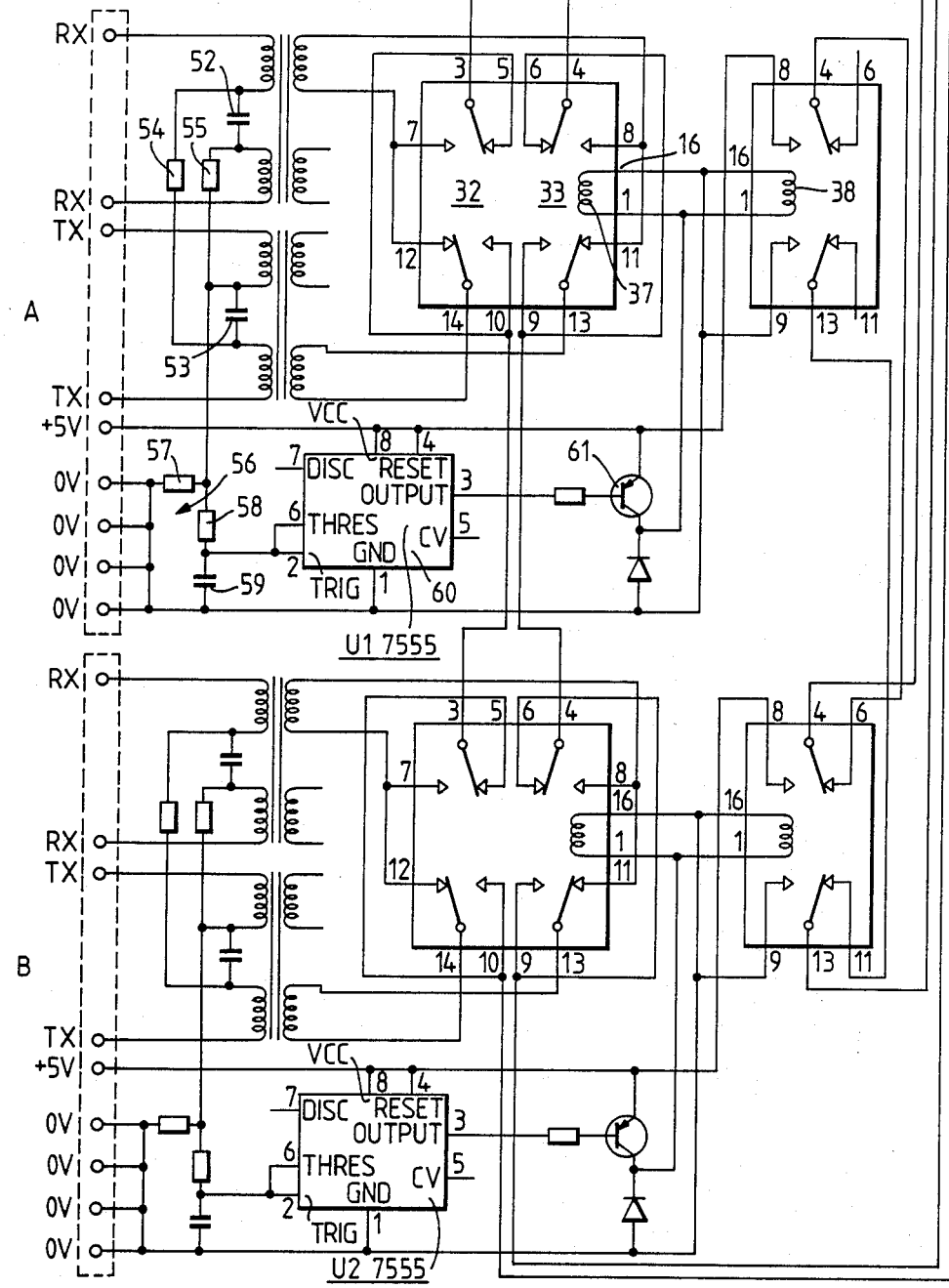
Fig.4a.(SHT 1)

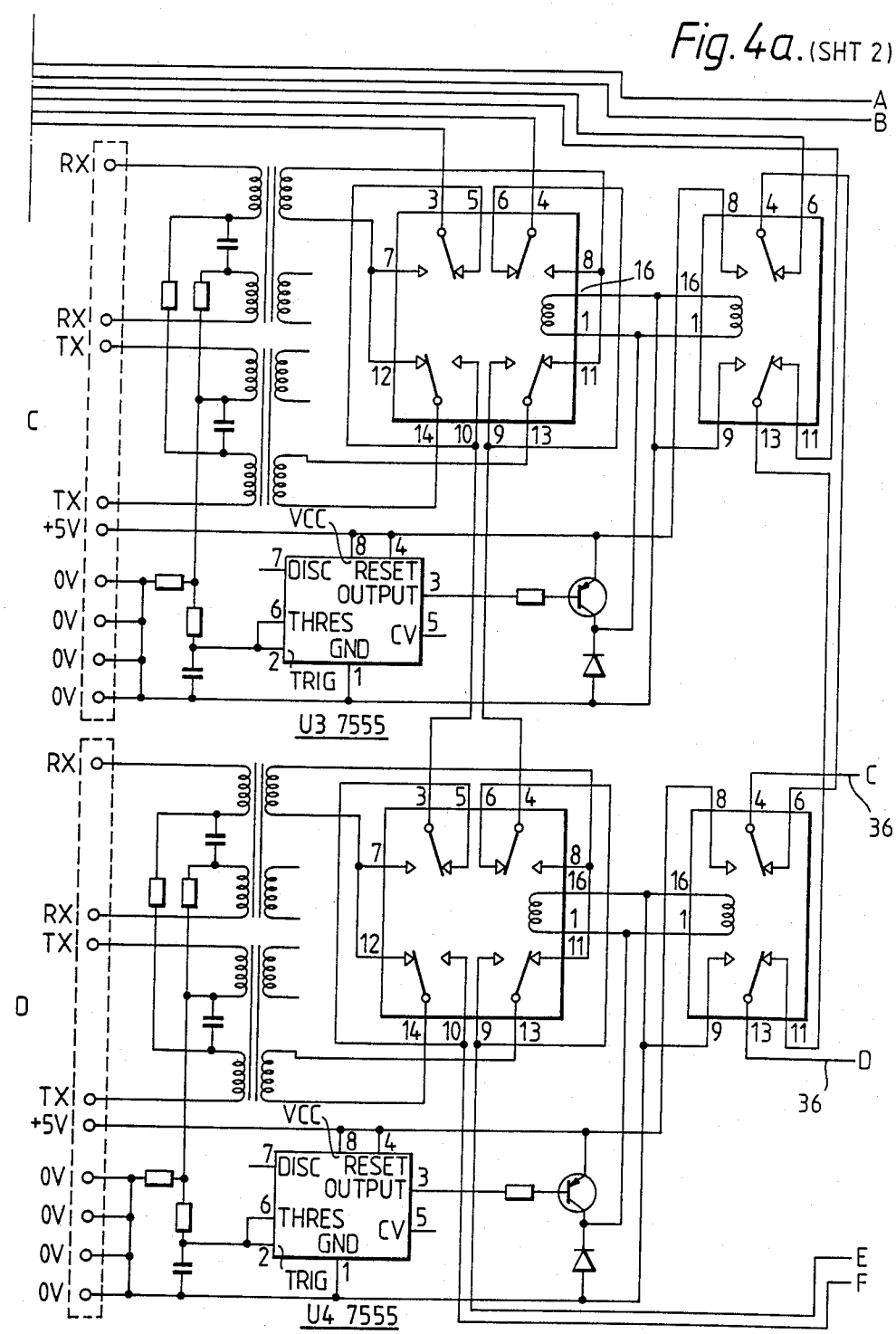
Fig. 4a.(SHT 2)

TOKEN RING SYSTEM HIERARCHY

CROSS REFERENCE TO RELATED APPLICATIONS

The present application is a Continuation-in-Part of U.S. Ser. No. 177,764 now U.S. Pat. No. 4,905,230 by the same inventors, filed on Apr. 5, 1988, and is assigned to the same assignees.

TECHNICAL FIELD

This invention relates to a token ring implementation of local area networks (LANS) for computer communications.

BACKGROUND TO THE INVENTION

It is known to couple a LAN system in which computers are arranged to communicate with one another using one set of protocols to another LAN system of computers using a different set of protocols. Such set-ups necessarily employ software programs to enable signals to be transferred between the systems without violation of the respective protocols. The need for special software would also be manifest when transferring communications between two computer communications systems of the same type because each system has its own specific environment in which computer calls are recognized and services. It therefore follows that all such combined systems, needing software interfacing, lack transparency between their parts and any hierarchal structure would bring in train unmanageable complications.

The present invention is directed towards facilitating a hierarchal structure of computer communications systems, all operating within the constraints of token ring protocols, wherein at least one of the systems comprising the hierarchal structure has a core comprising a token ring hub as described and disclosed in our aforesaid copending application Ser. No. 177,764 and another one of the systems may be either a token ring LAN system or comprise a further token ring hub as aforesaid. Each such token ring hub is characterized by having means adapted to receive a signal indicative that the requirements of the standard token ring protocols are satisfied with respect to a computer connected directly or indirectly to the hub and in response to said signal to forward a comparable signal to the next system into which the hub is inserted in hierarchal succession. The latter signal is likewise indicative that the requirements of the intrinsic protocols are satisfied with respect to the connection of the hub per se into said next system. In the present context, a hierarchal connection is a connection which has the capability of at least one further connection to it so as to form one link in a possible chain of connections. Each such connection also facilitates one or more merging connection. "Transparency" in the present context means that the effect of a connection is to physically and electrically enlarge a pre-established token ring and the effect of a disconnection is to physically and electrically reduce the said token ring, all without any interference in communications proceeding between existing or remaining elements of the ring. When another system is connected in this way the elements of the other system may be communicated with as though they are pre-existing members of the ring into which they are added.

Thus it is an object of the invention to provide a computer communications system in which some of the parts have hierarchal relationships with other parts. It is also an object of the invention to provide a hierarchal system in which the parts are adapted to a token ring topology and may be coupled to a LAN computer communications system implemented as a token ring.

These objects and features of the invention are further described hereinafter by way of example and with reference to the accompanying drawings.

Figure 1:
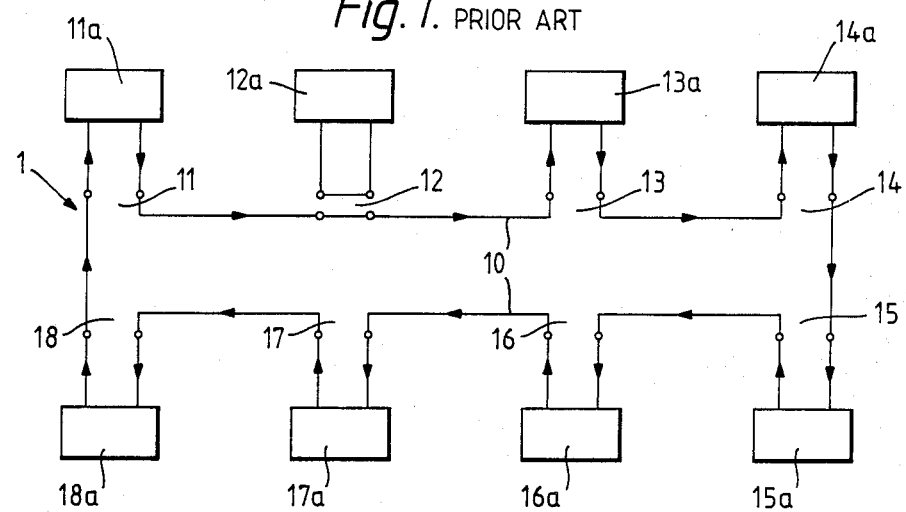
FIG. 1 (prior art) shows diagrammatically a local area network (LAN) implemented as a token ring.

Referring to the drawings, in FIG. 1 there is shown schematically the standard implementation of a simple token ring LAN 1 such as may be installed in a suite of offices. The details of the implementation may be derived from BSI DD 136, ISO 8082, or IEEE 802.5. The ring comprises essentially a looped or endless communication channel or bus 10. A bus outlet is provided in each office or work area, there being eight shown in all, comprising outlets 11-18. Corresponding with each outlet there is shown a work station or personal computer 11a-18a. As seen, work stations 11a and 13a-18a are all coupled into the ring and form part of it. Work station 12a, however, is bypassed and as a consequence is isolated from the ring. Whenever any of the work stations are electronically withdrawn from or are physically disconnected from the token ring LAN the associated ends of the bus are re-joined so that the ring is always continuous. This effect is shown more clearly in FIG. 2.

Figure 2:
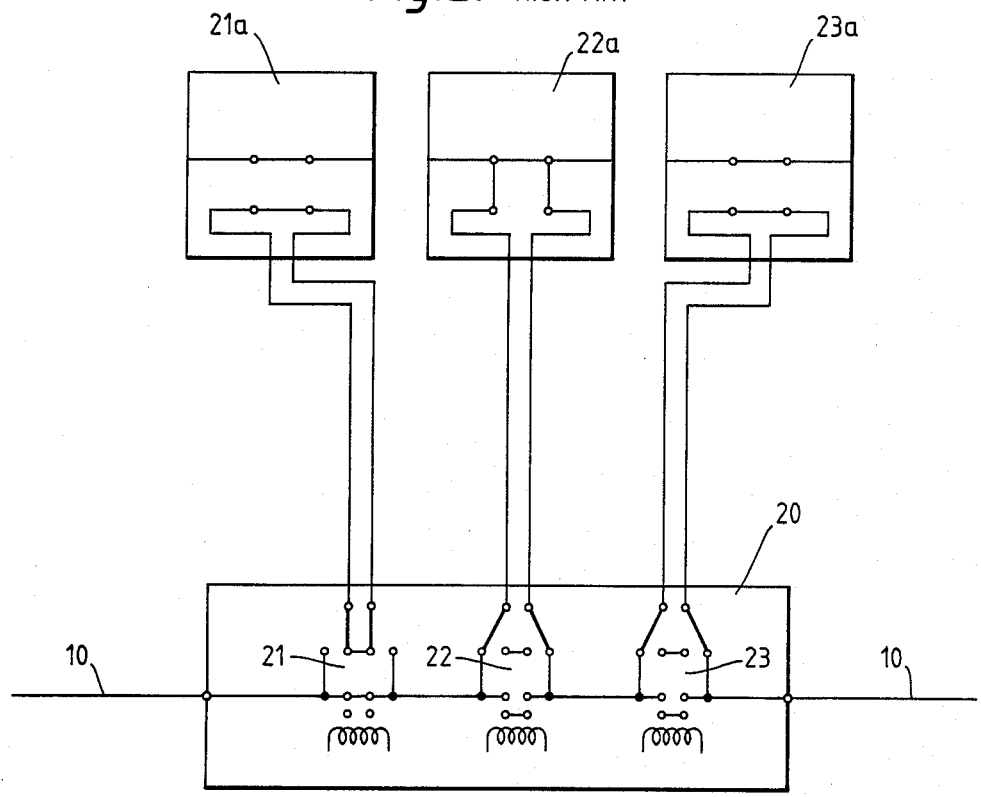
FIG. 2 shows a representative trunk coupling device (or socket outlet) for several work stations as used in the art in respect of token ring installations.

It is sometimes necessary to provide a plurality of outputs for the token ring LAN at the same location and a trunk coupling device 20, represented in FIG. 2, is specified for this purpose. Such a device may be thought of as a fixed three-way socket having the bus 10 connected to it on either side. Within the device are three socket outlets, 21, 22, 23, each of which is adapted to receive a standardized plug (not shown) by means of which a respective computer may be coupled into the ring. The trunk coupling device has three computers (21a-23a) connected to it, each comprising a separate work station using the token ring LAN to communicate with one another and/or to other work stations around the ring. Computer 21a is offline and hence, though physically connected to the trunk coupling device, there is no electrical connection into the bus 10, which is shown as bypassing this computer. The computer 22a has the "token", being actively connected onto the bus 10. The latter is therefore diverted through the computer transmitter and receiver data input/output lines. Computer 23a is online and in a ready state but is not transmitting at the instant shown. As in the previous instance, the bus is diverted through the computer input/output circuits. In actuality the circuits are normally coupled through transformer windings and there is no direct physical electrical connection between the computer circuits and the LAN data lines.

Figure 3A:
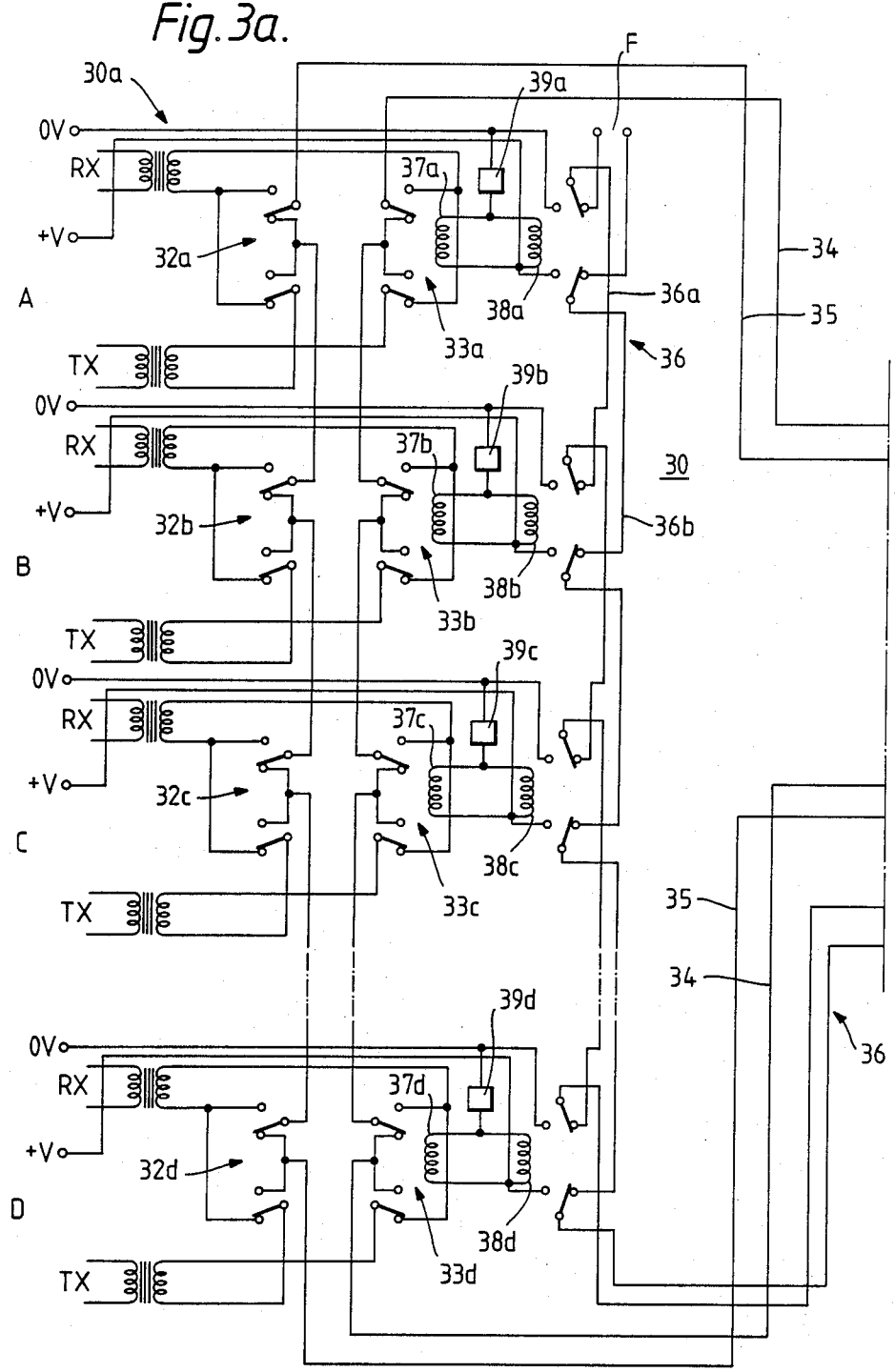
FIGS. 3(a) and 3(b) show, in schematic functional form, a token ring expansion hub unit.
Figure 3B:
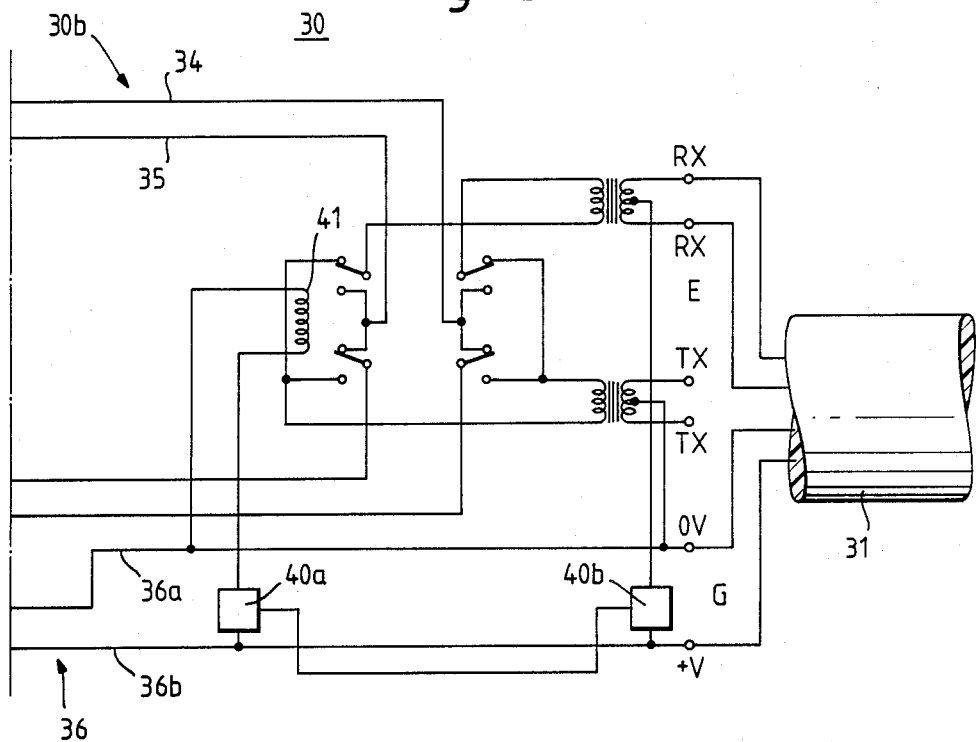

FIGS. 3a and 3b show an example of the token ring hub unit 30 employed in the invention. It comprises two electrically connected circuits 30a and 30b housed within a unitary casing and a wander lead 31a which is connected at one end to an outlet port E of the circuit 30b and at its other, free, end to a connector 31b shown only by its electrical terminals, which plugs into a tank coupling device. The circuit of FIG. 3a comprises a multi-socket expander. The circuit of FIG. 3b comprises the expander outlet, also called "a trunk insertion unit", interfacing the port E.

In its offline, closed down, condition the unit 30 comprises two separate closed-loop, or endless, lines, namely a transmitter line 34 and a corresponding receiver line 35, each of which passes successively through socket areas A–D of expander 30a and the trunk insertion unit interfacing port E. There is also a biasing signal direct current line 36 comprising leads 36a and 36b which may be traced from an open circuited end at F through to the trunk insertion unit at G. This additional line also passes successively through each socket area A to D. Both the connector 31b, which plugs into a trunk coupling unit, and the sockets of the expander are standardized elements and are comparable in size with standard domestic telephone plug and socket connectors. The unit 30 can be of quite modest proportions, well adapted to being carried around and for being moved from one room, or location, to another. As shown, it has four sockets, but it may be provided with more sockets or fewer than four. In use the token ring hub may serve as a "stand alone" device, i.e. as a portable token ring not having any connection to a LAN and permitting a limited number of work stations in the same locality to communicate with each other. Alternatively it may serve as an expander, permitting several work stations grouped relatively closely together to be flexibly located and all have access to a token ring LAN as well as to one another. In principle, and subject to the limitations laid down for token ring topology, token ring hubs according to the invention can also be piggy-backed.

Each socket area A–D includes a respective physical socket (not shown) for receiving a connector (also not shown) with the necessary provisions for electrical contact and each essentially comprises a multi-pole ganged relay actuated set of contacts 32(a–d), 33(a–d) and an associated relay (37a–d). Associated with each socket area is an auxiliary relay circuit, including relays 38a–d, each of which is connected in parallel with respective relays 37a–d, by means of which a direct current biasing signal may be switched onto the line 36. Each socket area has associated therewith a transmitter isolating transformer TX and a receiver isolating transformer RX the secondary windings of which are respectively connected under offline conditions in a closed loop through the said contacts of the associated relay 37a–d.

Though not shown, it will be understood that the primary windings of the aforesaid transformers are coupled via input/output circuits of the respective computers to standard adapter cards located in the respective computers. These adapter cards are responsible, among other things, for instituting the protocol procedures at the physical level involving the connection of the respective computers onto a token ring. Before effective connection of a computer to such a token ring is permitted these cards automatically carry out a standard sequence of tests to ensure that the electrical connections onto the ring will comply with the Standards specifications.

The adapter cards have a precisely similar function with respect to the connection of respective computers onto the present device. In the course of the aforesaid tests a signal is applied by the adapter card to the direct current signal terminals marked OV, +V, at the respective socket. This signal is detected by the respective switch circuit (39a–d) and at the end of a prescribed period, determined by a respective timer in the switch circuit (39a–d) a bias signal is applied to the respective parallelly connected relays. This has the effect of switching the secondary windings of the transmitter receiver transformers coupled to the input/output circuits of the computer, into the corresponding parts of the lines 34, 35, and it also connects the bias signal which is provided by the associated computer adapter card onto the signal line 36 for forward signalling purposes. In the event that the token ring hub 30 is already functionally coupled to a token ring LAN as a consequence of another computer being previously coupled to the hub, the computer is then inserted into the token ring LAN via the trunk insertion unit 30b. In the event that the connection to the token ring LAN still has to be established, the biasing voltage at G, under the control of protocol testing circuitry 40a and b in the trunk insertion unit 30b then signals the socket relay in the trunk coupling device 20 to make the connection onto the token ring LAN and also trips relay 41 in the trunk insertion unit 30b so as to connect the hub ring to the ring of the LAN. Suitable circuit arrangements provided in the trunk insertion unit 30b carry out appropriate tests essential in order to satisfy the protocol requirements.

In FIG. 4a and b is shown a circuit implementation of the token ring hub unit of FIG. 3. Though illustrated with four work station connection points or "socket" areas A–D (in FIG. 4a) the unit may comprise fewer or more such circuits. As these areas are all identical, only the circuitry associated with Area A is described in the following.

It will be seen that the two primary windings of the transmitter and receiver transformers are each split in half, the two halves of each winding being coupled serially together by a respective capacitor 52, 53. The outer halves of the two primaries are joined serially through a resistor 54. The two inner halves are connected, one additionally through a resistor 55, to a voltage ramp circuit 56 comprising resistors 57, 58 and capacitor 59. The output of the ramp circuit inputs a trigger circuit 60 which, together with the ramp circuit 56, acts as a timer. A switch circuit 61, responsive to the timer output, sends an operating signal to the relays 37, 38 when the timer times-out in the event that a voltage is present on the +5V power line.

Figure 4B:
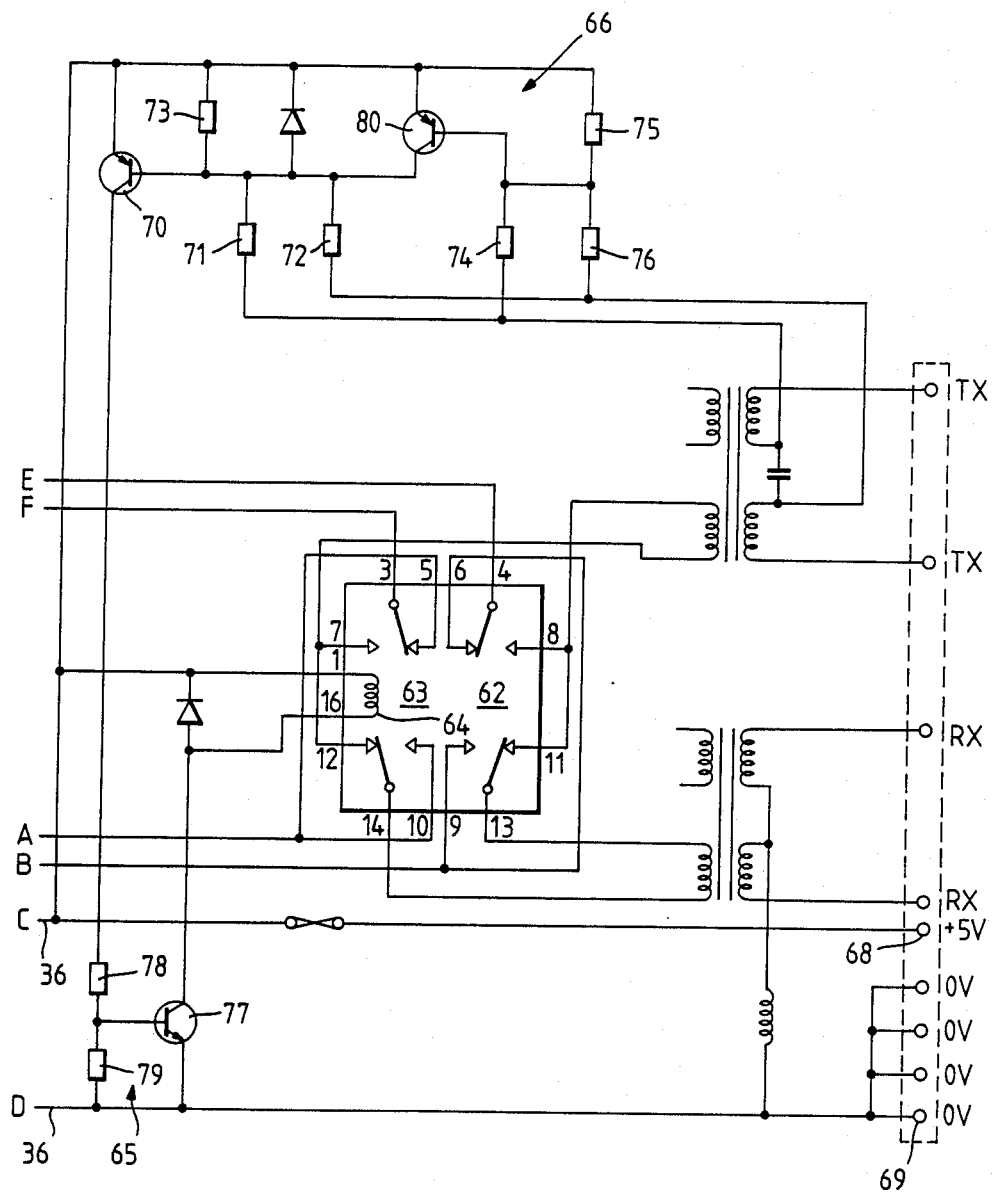
FIG. 4 shows in more detail the circuit arrangement of the unit illustrated schematically in FIG. 3.

Referring to FIG. 4b, which shows the trunk insertion unit, a relay switching circuit 62, 63, similar to the relay switching circuits 32, 33 of the "sockets" but rotated electrically through 180°, normally patches the transmitter and receiver rings so that each ring is closed at that location witout any external coupling. On operation of the switches, however, when the relay coil 64 is energized each loop is opened to receive a primary winding of a respective transmitter or receiver input/output coupling transformer. Relay winding 64 is responsive to a switching circuit 65 which is controlled by a protocol circuit 66. The bias signal line 36 incorporates a fuse 67 and is permanently coupled to outlet connectors 68, 69.

Protocol circuit 66 receives a bias signal from the line 36 upon successful insertion of a work station into one of the sockets A–D and operates to inject a bias signal into a relay circuit (which corresponds to the relay circuits of the aforesaid sockets) in the trunk coupling device to which the trunk insertion unit is connected.

In the inoperative state of the token ring hub the relay contacts 32(a–d), 33(a–d) complete a balanced ring network through contacts 4–6 and 3–5, and also feed a balanced a.c. signal from the connector TX pins to the respective RX pins through contacts 13–11 and 14–12 and via the isolating transformer. With the exception of the ring path through the switches 62, 63 of the trunk insertion unit the components of the latter play no part in the operation of the token ring hub when the latter is serving as a stand-alone device.

Before a computer intended for connection onto a token ring inserts itself into the ring its adapter card performs a series of tests. These tests are carried out with respect to the sockets A–D of the token ring hub. Thus the respective adapter card drives the TX pins with an a.c. signal and checks that the a.c. signal is returned on the RX pins. This test checks the cable between the adapter card and the local ring hub, the transmitter and receiver transformers of the latter, the capacitors 52, 53, and the normally closed contacts 32, 33. If this test is successful the adapter card then supplies a positive supply of approximately +5V, to both transmitter pins TX, and it measures the currents drawn by the resistors 54, 55, which return to ground via the RX pins of the receiver transformer. If the currents drawn by the resistors are within defined limits, implying there are no breaks, or shorts, in any of the cable cores, the voltages are maintained on the TX pins and the voltage at the output of the ramp circuit climbs as the capacitor 59 charges. After 70 milliseconds the output of the trigger circuit 60 goes low, switching on the switch circuit 61 which sends a bias signal to the relays 37, 38. This causes the switches 32, 33 to operate, breaking the local ring connection, breaking the a.c. loop from the TX pins to the RX pins and thus inserting the computer into the internal ring. The adapter card continues to monitor the currents through resistors 54, 55 all the time that the computer is inserted and removes the voltage supply on the TX pins if it finds any irregularity. When the voltage is removed, either because of fault conditions or normal removal of the computer from the ring, capacitor 59 discharges through resistor 58 and after 70 milliseconds the relay drops out. Capacitors 52 and 53 are used to isolate the two d.c. test current paths and act as low impedances to signal frequencies.

When the trunk insertion unit is connected into the socket of a trunk coupling device the token ring hub then operates as an expander in relation to the token ring LAN to which it appears as though it were an adapter card. The bias signal line 36 passes the bias signal voltage level to the output connector pairs 68, 69 and also to the test circuit 66. A voltage on connector pins 68, 69 will be present whenever one or more of the computers is connected to the token ring hub.

When the trunk insertion unit is connected there will be resistors present between the TX and RX pins. Direct currents will be drawn through resistors 71, 72 in circuit 66 which turns on the transistor 70 if it is above 1.3 milliamps. Resistors 71, 72 provide current limiting of around 100 milliamps per line. Resistor 73, in combination with resistors 74, 75 and 76, set the current threshold for transistor 70 to turn on. When the latter turns on, transistor 77 is switched on as a consequence of the current drawn through resistors 78, 79 and the current through transistor 77 energises the relay 64. If the current drawn from either TX pin is excessively high, transistor 80 will be turned on, which turns off transistors 70, 77, and prevents the relay 64 from pulling in.

Thus relay 64 is energised if the trunk insertion unit is connected into a socket of a trunk coupling device and the correct current is being drawn from both of the TX pins and if one or more of the computers are successfully inserted into the sockets of the local ring hub. The current provided from the TX pins will energise the relay 64 and the token ring hub will be inserted into the main token ring of the LAN as if it were itself an adapter card.

The bias voltage level is also fed out into the trunk coupling device to trip the socket relay of that unit. The line 36 is fused to prevent damage to the relay contacts in the event of a direct short.

Figure 5:
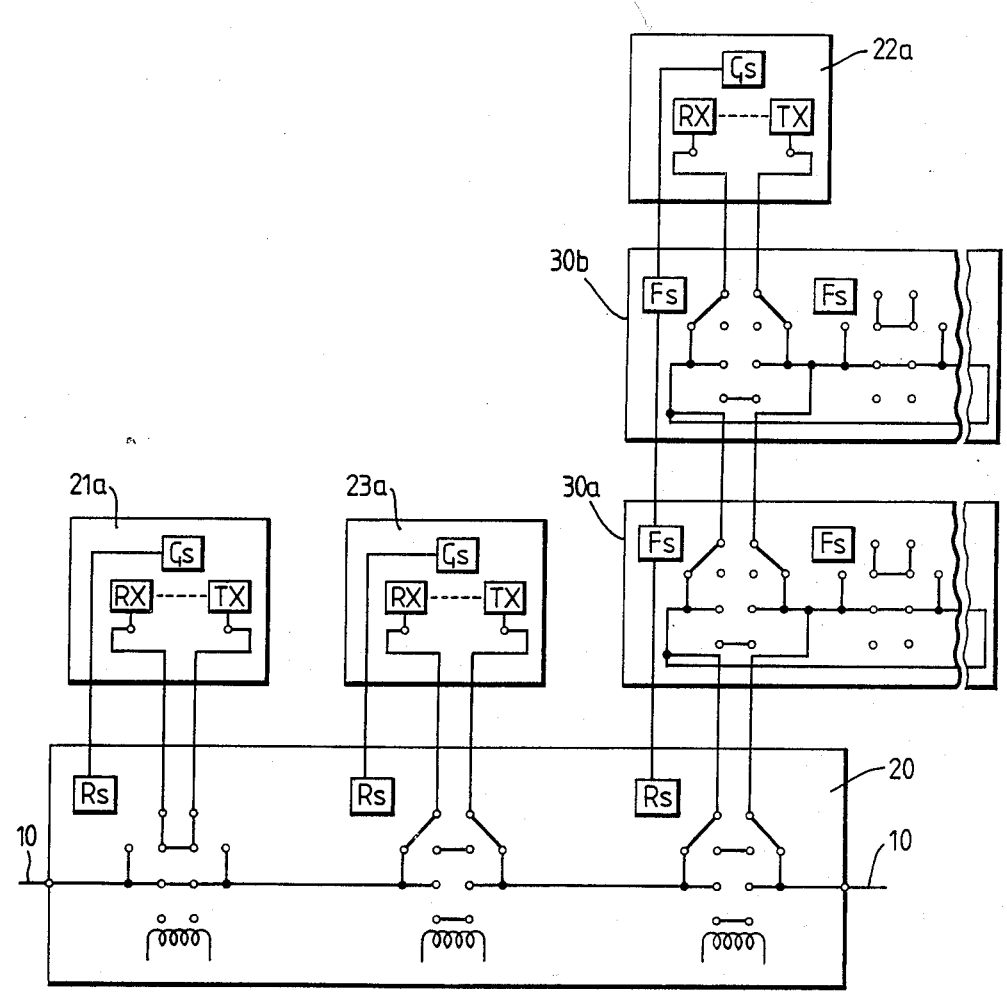
FIG. 5 shows the use of token ring hubs as described herein and claimed in our aforesaid copending U.S. application Ser. No. 177,764 to form a hierarchal computer communications network in conjunction with an existing (prior art) LAN implemented as a token ring.

In FIG. 5 there is shown in diagrammatical form a communications system similar to that illustrated in FIG. 2, having a local area network (LAN) comprising a bus 10 into which a trunk coupling device 20 is installed. The trunk coupling device 20 comprises three "sockets" two of which, from the left-hand side as seen in the drawing, are filled by computers 21a and 23a. Computer 21a is off line. Computer 23a is on line.

Connected to the right-hand socket of the trunk coupling device 20 of FIG. 5 is a hierarchal system according to the invention having a plurality of levels in the hierarchy. This system comprises a first token ring hub 30a as claimed in said copending application Ser. No. 177,764, which is plugged into the trunk coupling device 20, a second token ring hub 30b also as claimed in copending application Ser. No. 177,764, plugged into one of the expansion sockets of the said first token ring hub 30a and an on-line computer 22a connected into an expansion socket of the hub 30b. Both hubs 30a, 30b are illustrated diagrammatically and show only two respective expansion ports. Each hub may comprise two or more such ports. For the purposes of simplification and clarity in the Figure, only one computer (22a) is shown connected. However, it is to be understood that any number of the available ports of these hubs within the limits permitted by the system, may be occupied by respective computers or by other such token ring hubs and the expansion ports of the latter, if present, may or may not be occupied with further computers and/or hubs. Likewise, a further hub or hubs may be interposed between computer 22a and hub 30b.

Each of the computers has (in its respective token ring adapter card) a bias signal generator Gs. In the case of computers 21a and 23a the signal line from the generator Gs is connected directly to a respective receiver Rs in the trunk coupling device 20, such being known, conventional, connections. In the case of computer 22a as shown, the signal line from the generator Gs is connected to the forward signalling means Fs in the token ring hub 30b to which the computer is connected. The means Fs in hub 30b generates a biasing signal on a line which corresponds to the signal lines between the generators Gs of computers 21a, 23a and the respective receivers Rs of the trunk coupling device 20. The signal line of hub 30b is connected to a respective forward signalling means Fs of hub 30a which in turn is connected to the receiver Rs in the respective socket in the trunk coupling device 20. Each of the forward signalling means Fs consists of the circuit 39, the line 36 and the circuits 40a, 40b illustrated in FIGS. 3a and 3b, or their corresponding implementations illustrated in FIGS. 4a, 4b. Each circuit Fs provides a signal to the ongoing unit which is indicative that the protocol imperatives have been satisfied with respect to the insertion of the device containing the circuit Fs in the token ring of the ongoing unit (or LAN). However, in this respect it will be appreciated that all such signals are initiated in the token ring adapter card of a computer and if no computer is connected to either of the hubs 30, 30b, then there will be no ongoing bias signal generated for reception by the receiver Rs of the trunk coupling device 20.

We claim:

1. A communications network comprising a plurality of computer communications systems, all operating within the constraints of token ring protocols, said systems being arranged in a hierarchy which operationally defines a single, shared, token ring, said network further comprising
   (a) at least one token ring hub;
   (b) a token ring LAN system into which said hub is connected to form a subsidiary hierarchal level, each said token ring hub further comprises means adapted to receive a signal indicative that the requirements of the standard token ring protocols are satisfied with respect to a computer having a token ring adapter card connected to the hub and, in response to said signal, said means transmits a comparable signal to said token ring LAN system into which the hub is inserted in hierarchal succession, the transmitted signal being likewise indicative that the requirements of the intrinsic token ring protocols are satisfied with respect to the connection of the hub per se into said token ring LAN system.

2. A communications network according to claim 1 in which at least two adjacent hierarchal levels are formed by token ring hubs, one connected into the other.

3. A communications network comprising a plurality of computer communications systems, all operating within the constraints of token ring protocols, said systems being arranged in a hierarchy which operationally defines a single, shared, token ring, said network having at least a first and a second token ring hub, said first token ring hub being at a lower hierarchal level than the second token ring hub and being connected thereinto, and in which each said token ring hub in said structure further comprises means adapted to receive a signal indicative that the requirements of the standard token ring protocols are satisfied with respect to a computer having a token ring adapter card connected to one of said hubs and, in response to said signal, said means transmits a comparable signal to another of said systems into which the hub is inserted in hierarchal succession, the transmitted signal being likewise indicative that the requirements of the intrinsic token ring protocols are satisfied with respect to the connection of the hub per se into said another system.

* * * * *